Jan. 16, 1968   W. O. WEBER   3,363,283
LIP FORMING METHOD AND APPARATUS
Filed May 11, 1964   5 Sheets-Sheet 1

INVENTOR
WALTER O. WEBER
BY Cushman Darby & Cushman
ATTORNEYS

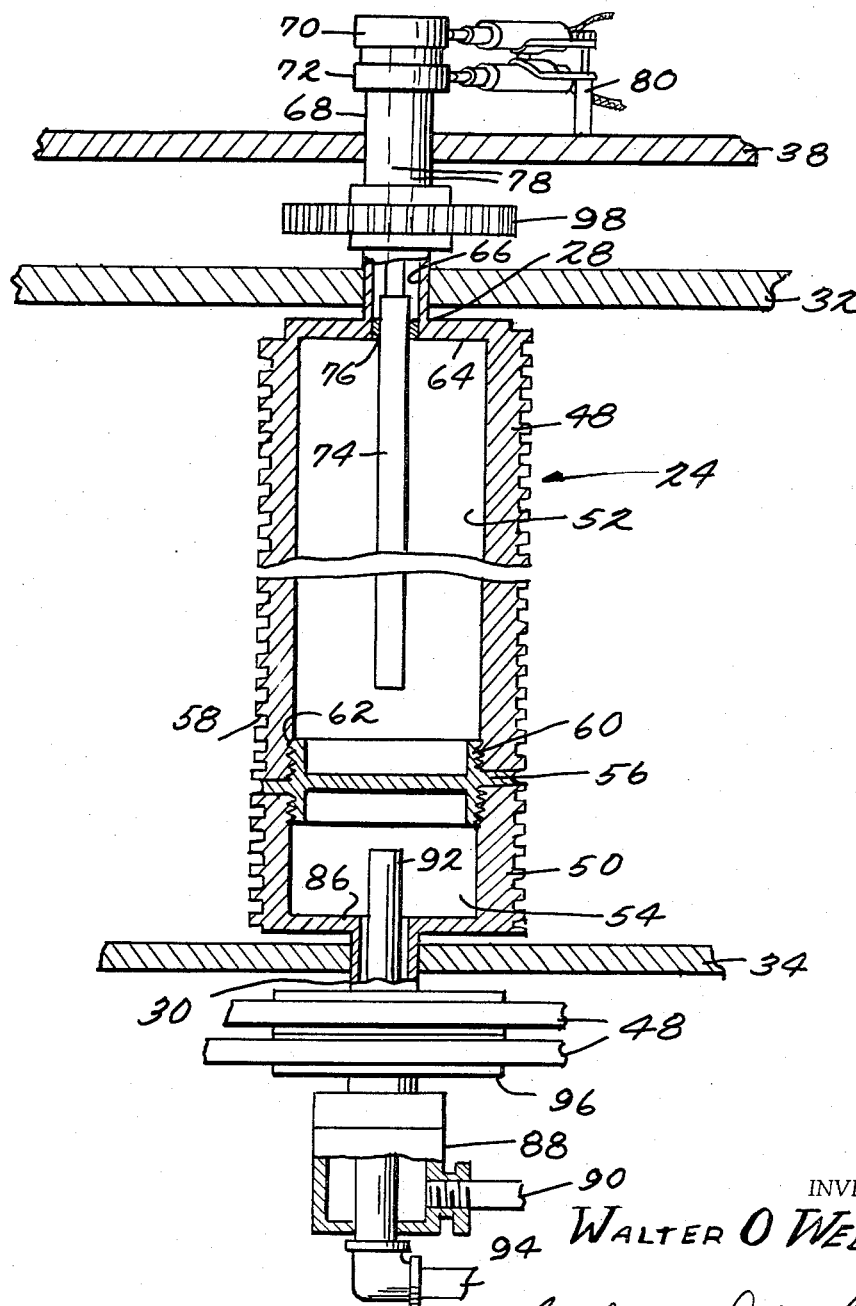

Jan. 16, 1968  W. O. WEBER  3,363,283
LIP FORMING METHOD AND APPARATUS
Filed May 11, 1964  5 Sheets—Sheet 3
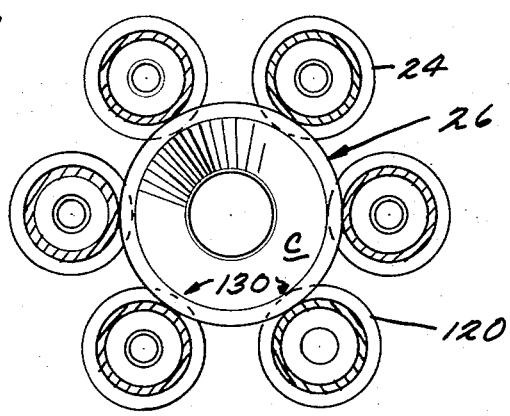
Fig. 6.
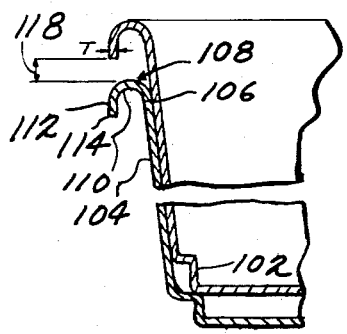
Fig. 3.
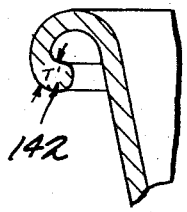
Fig. 9.
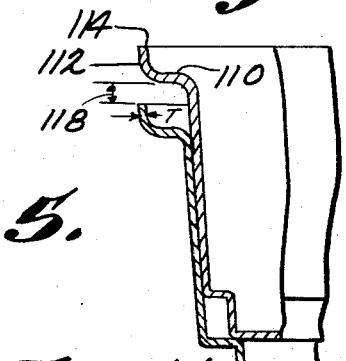
Fig. 4.
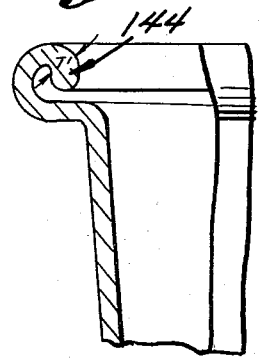
Fig. 10.
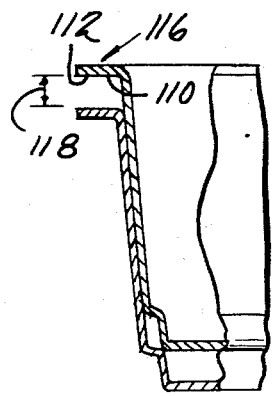
Fig. 5.
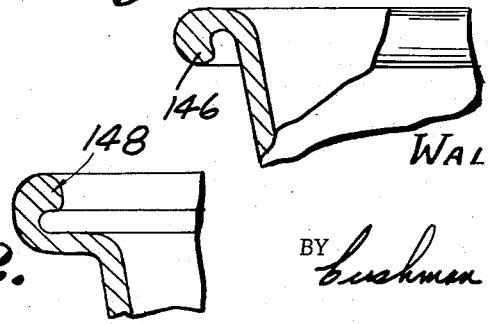
Fig. 11.
Fig. 12.
INVENTOR
WALTER O. WEBER
BY Cushman Darby Cushman
ATTORNEYS

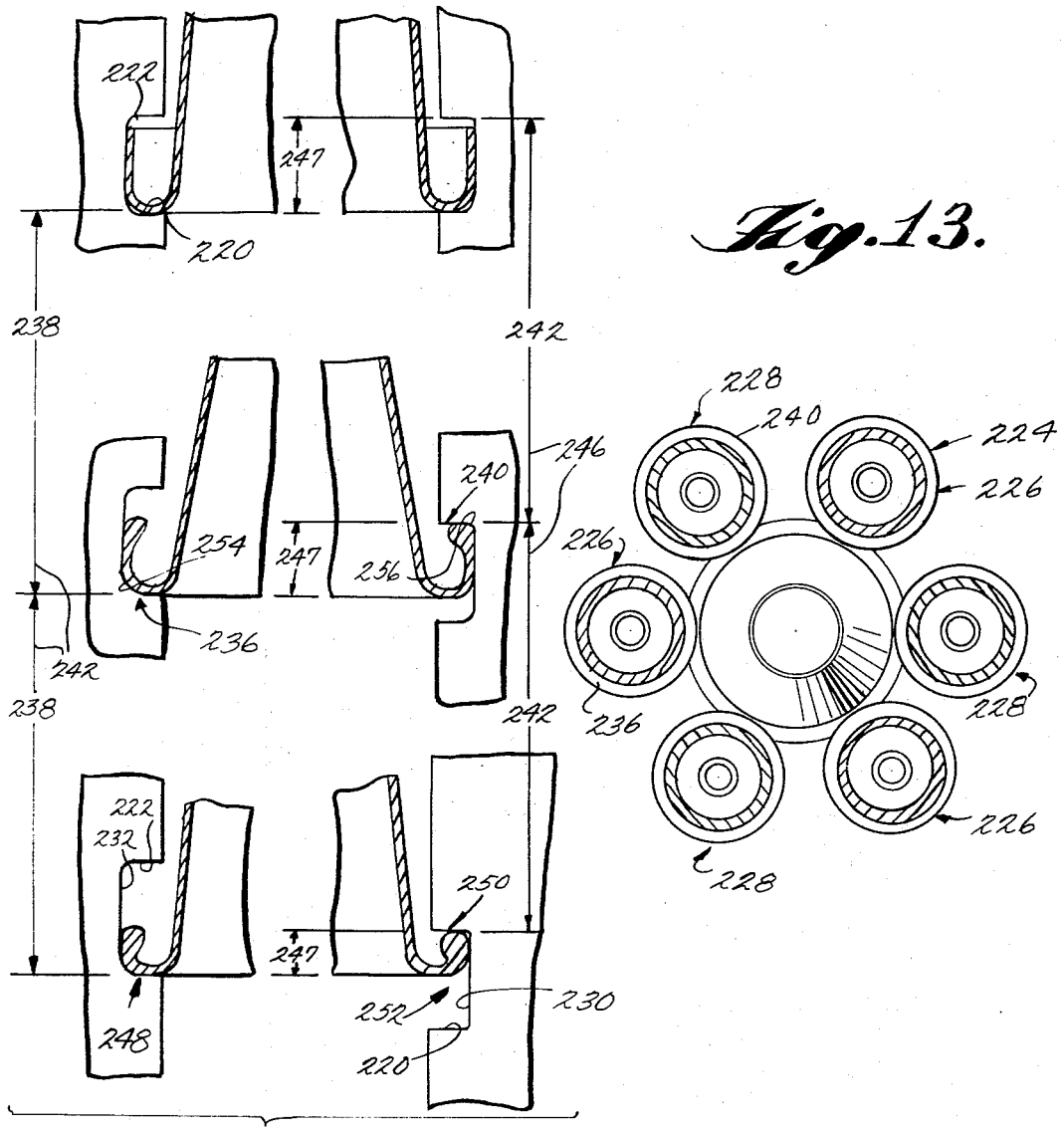

United States Patent Office 3,363,283
Patented Jan. 16, 1968

3,363,283
LIP FORMING METHOD AND APPARATUS
Walter O. Weber, Newark, Del., assignor to Haveg Industries, Inc., Wilmington, Del., a corporation of Delaware
Filed May 11, 1964, Ser. No. 366,319
10 Claims. (Cl. 18—19)

ABSTRACT OF THE DISCLOSURE

A plurality of helically grooved members for forming a smoothly beaded lip on the rim of a container in which heat is applied to the grooves and the dimension of the helical groove corresponding to the initial direction of the outer extent of the marginal rim on a container decreases, thereby deforming and beading the free edge of the marginal rim into a smooth lip.

One preferred embodiment of the apparatus and method provides for the alternate engagement of the rim at the top and bottom portion thereof by adjacent helically grooved members.

---

This invention relates to containers and more particularly to an apparatus for forming a smooth lip on the container.

The processes and apparatus for forming lips on containers have become increasingly refined with emphasis being placed on speed by which the lips are formed and the smoothness of the resulting lip. Such advances in the art are typified by the U.S. patent to Edwards No. 3,096,-546, July 9, 1963, and my copending application Ser. No. 350,398, filed Mar. 9, 1964.

When container blanks are severed from sheet material, the outer marginal edge of the container is left with occasional jagged spots which can cause cutting and irritation. The Edwards patent and my copending application are directed to methods in which this jagged edge is deflected out of the way so that the lips of the user will not come in contact with the severed edge. The difficulty involved in this type of lip roller is the fact that occasionally lips will unroll and expose the jagged, severed edge.

The object of this invention, therefore, is to provide broadly a superior apparatus for forming lips on containers which will avoid these difficulties.

More specifically, it is an object of this invention to provide an apparatus for forming a smoothly beaded surface on the severed edge of the outer marginal portion of the rim of the container.

A further object of this invention is to provide an apparatus for heating the outer marginal portion of the rim of the container and subsequently applying a compressive force to deform the outer marginal portion of the rim into a smooth lip having a greater material thickness and an equal or greater density than the original material thickness and density of the outer marginal portion of the rim.

This invention has been limited to use on containers having a marginal rim of foamed plastic material. It has been found that the foamed plastic material gives sufficient rigidity to the marginal rim of the container to prevent buckling when compressive forces are applied to the rim. Furthermore, the foamed plastic has a definite integral thickness which, when deformed under heat, provides a bead of equal or higher density than the undeformed foamed plastic. The resulting beading and deformation gives the lip strength and an attractive smooth appearance.

Another advantage of this invention is the increased speed at which lips can be formed on containers. In the Edwards patent, for instance, one operating machine in accordance with the principles of the Edwards invention had rollers operating at the rate of 300 r.p.m. thereby producing containers from each stack at the rate of 300 containers per minute. The present invention, on the other hand, will produce containers from each stack at the rate of from 500 to 1,500 containers per minute. The difference in rate of production is due to the forming means. When container rims are deflected, it is necessary to operate more slowly in order to achieve a smooth deflection. However, when heat is applied to the rims of the containers and when the edge and rim are subsequently beaded and deformed, the containers can move at a much greater speed because the operation is not as exact as a deflection operation. Furthermore, the range of container production contemplated by this invention is dependent upon a time-temperature relationship such that the temperature of the foamed plastic rim does not exceed its low viscosity point. Thus, it is evident that if the lip forming machine employs a high temperature in heating the marginal rims of the containers, the container must only be in contact with the forming members for a short time as the foamed plastic material would become too hot and assume a soft jelly-like consistency having no strength. Due to the more inexact forming method, it is possible to form a smooth lip in this relatively short time. Just as rapidly as the temperature of the foamed plastic is brought to a sufficiently high temperature, the surface tension of the foamed plastic skin will cause the severed edge to bead into a smooth edge. Likewise, just as rapidly as the temperature of the foamed plastic is brought to a sufficiently high temperature, the marginal portion of the rim will be softened sufficiently to be deformed into a smooth lip.

A still further advantage of the present invention is that the method of forming a lip by the use of heat and compressive forces can be applied to containers having side walls terminating in an annular marginal rim having an outwardly extending inner marginal portion integrally connected at its outer end to one end of a substantially axial outer marginal portion, with respect to the container axis, which terminates at its other end in a severed edge. Such outer marginal portion may either extend axially upwardly or axially downwardly from the inner marginal portion. Additionally, the principles involved in this invention can be applied to containers having a side wall terminating in an outwardly extending marginal rim portion only.

Still a further object of this invention is to provide an apparatus for applying compressive forces by means of upwardly and downwardly facing surfaces.

Similarly, a further object of this invention is to provide an apparatus for applying compressive forces by means of upwardly and downwardly facing surfaces which are alternately carried by a plurality of generally cylindrical members equiradially disposed from a common central axis.

Another object of this invention is to provide an apparatus for forming a smooth lip on containers whereby the containers can be fed in a nested upright position.

These and other objects of this invention are more fully described in the following detailed description having specific reference to the attached drawings in which the embodiments of the apparatus of the invention are depicted, not to limit the scope of the invention in any respect, but so that the principles thereof might be more clearly illustrated.

In the drawings:

FIGURE 2 is an enlarged elevational view of one member of the apparatus of FIGURE 1, with parts broken away to expose details otherwise hidden from view;

FIGURES 3–5 are fragmentary side elevational views of a plurality of stacked containers showing various configurations of the marginal rim before a lip has been formed;

FIGURE 6 is a plan elevational view taken substantially along the lines 6—6 of FIGURE 1;

FIGURES 9–12 are fragmentary side elevational views of the containers showing various lip configurations formed from the rim configurations shown in FIGURES 3–5;

FIGURE 13 is a plan elevational view showing one modification of the invention taken substantially along the same lines as FIGURE 6;

FIGURE 14 is a fragmentary side elevational view of the members alternately carrying the upwardly and downwardly facing lip-forming surfaces as embodied in one modification of the invention with progressive views of the lip being formed on the container.

Figure 1:
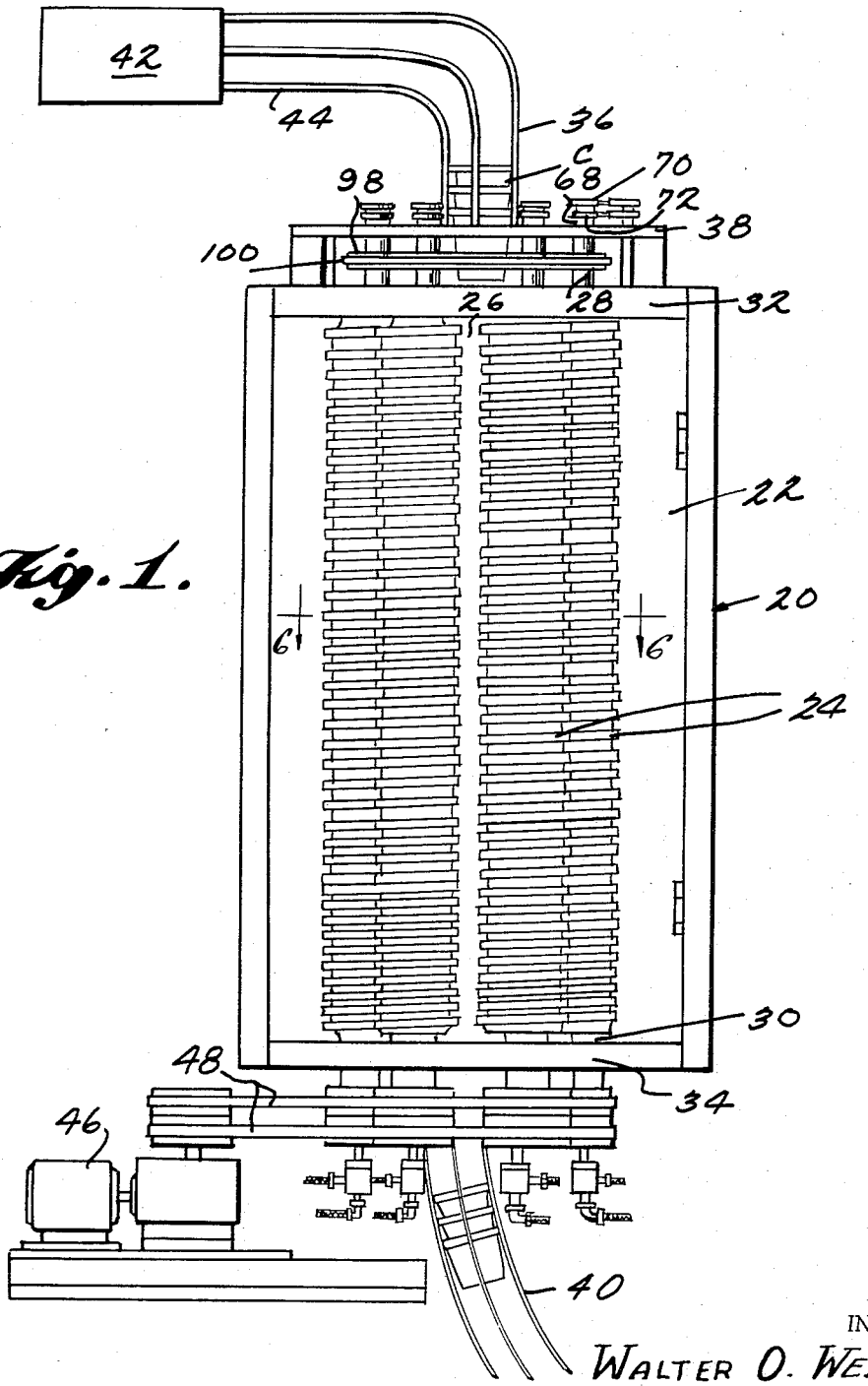
FIGURE 1 is a side elevational view of the apparatus embodying the principles of the invention.

Referring to FIGURE 1, a container lip-forming machine embodying the principles of the invention is illustrated at 20 and comprises an optional cabinet 22, preferably made of transparent material, surrounding a plurality of generally cylindrical members 24, which are symmetrically and equiradially disposed from a common axis with which they extend, in the preferred embodiment, in a generally parallel fashion so as to define a generally cylindrical passage 26 through which the containers C pass. The members 24 have upper and lower axial extensions 28 and 30, perhaps better illustrated in FIGURE 2, which are journalled for rotation respectively in upper and lower bearing plates 32 and 34 along axes parallel and equiradially disposed from the common central axis.

A feeder 36 is mounted on top of auxiliary bearing plate 38 and is axially aligned with the passageway 26 formed by the plurality of members 24. At the opposite end of the passageway a suitable receiver 40 is positioned to receive the discharged containers.

While the containers C are shown in FIGURE 1 simply placed in the feeder 36, it will be appreciated that many modifications of this arrangement can be used within the scope of the invention. For instance, rather than placing the containers in the feeder manually, the containers can be conveyed from either the cutting or forming station 42, see FIGURE 1, by means of a conveyor 44, such as an air conveyor, to the feeder 36. Furthermore, while the invention is disclosed having a stack of inverted containers C, thus indicating that the pneumatic feeding would have to overfeed the lip-forming machine, it is possible to underfeed the machine such that each container goes through the lip-forming machine separately.

An electric motor 46 drives a pair of endless belts 48 which in turn rotate the members 24 at the same speed and in the same direction, as will be more fully described hereinafter.

As best shown in FIGURE 2, each member 24 is preferably comprised of an upper section 48 and a lower section 50 having an upper chamber 52 and a lower chamber 54 formed respectively therein, preferably separated from one another by a thermal insulating member 56. The insulator 56 extends completely across the cross-section of member 24 so that its exterior forms part of the forming surface 58 of member 24. The insulator 56 is held in place by means of annular, exteriorly threaded flanges 60 which engage both the upper section 48 and the lower section 50 by means of interior threads 62 on the ends adjacent to the insulator 56. Within the scope of the invention the insulator could be held in place by any practical means and could, in fact, be eliminated. Within the scope of some embodiments it could also be eliminated so long as the upper section 48 and the lower section 50 maintain the degree of insulation required to achieve the purposes set forth herein.

Each member 24 at its upper end terminates in an annular end wall 64 having an upper extension 28 in the form of a conduit 66 extending coaxially upwardly through bearing plate 32 and auxiliary bearing plate 38 and terminating in an insulated fitting 68 carrying two spaced slip rings 70 and 72. A suitable electric heating cartridge 74 is positioned in the inner end 76 of conduit 66 and extends downwardly into the chamber 52. Lead wires 78 are connected from the slip rings 70 and 72 to the heating cartridge 74.

The auxiliary bearing plate 38 carries bracket 80 which is positioned adjacent to the insulated fitting 68. Two brushes, 82 and 84, connected to a suitable source of power not shown, are mounted in the bracket 80 and respectively engage slip rings 70 and 72 to provide power for the heating cartridge.

While the preferred method of heating the rims of the containers is through heating the lip-forming members by an electric heating cartridge supplied electrical current through a commutator, it will be appreciated that any suitable means can be employed to heat the rims of the container. For instance, if the rim is to be heated by heating the forming member, heat could be provided by a stationary heating element, such as a Calrod, positioned within the body of the forming member, or by steam heating means, such as disclosed in my copending application, Ser. No. 350,398, filed Mar. 9, 1964, the disclosure of which is hereby incorporated by reference. Likewise, the rim could be directly heated by cylindrical heating elements intermittently dispersed throughout the axial path of the movement of the container. It will be appreciated that the particular type of heating element used will in part be determined by the temperature desired to be developed.

Each member 24 at its lower end terminates in an annular end wall 86, having a lower extension 30 in the form of a conduit, extending coaxially downwardly through a lower bearing plate 34 and terminating in a rotary joint 88 communicating with the exterior through an outlet conduit 90. An inner conduit 92 of lesser diameter than the conduit formed in lower extension 30 is mounted coaxially with the conduit and extends from an inlet conduit 94 through the rotary joint 88 and through lower extension 30 into the upper interior of lower chamber 54. If it is desirable to cool the member, a cooling fluid can enter the upper part of the lower chamber 54 through conduits 94 and 92. The cooling fluid thereafter travels down the inner walls of lower chamber 54 cooling the lower section 50 of member 24 below the insulator 56 and subsequently leaves the lower chamber 54 through lower extension 30, rotary joint 88, and outlet conduit 90. While the member has been shown as being cooled by a fluid, it is within the scope of this invention to cool the member by any appropriate means.

A pair of spaced pulleys 96 is rigidly mounted on lower extension 30 below bearing plate 34 and above rotary joint 88. A pair of endless belts 48 engages the pulleys 96 to drive the same and thus rotates the member 24 when the belts 48 are driven by a suitable source of power, such as an electric motor 46, shown in FIGURE 1. Of course, it is within the scope of the invention to substitute other mechanical means to rotate the members.

A sprocket gear 98 is rigidly secured to upper extension 28 between upper bearing plate 32 and auxiliary bearing plate 38. As better illustrated in FIGURE 1, an endless chain 100 rides on the sprocket gear 98 and serves to operatively connect the members 24 with each other so that the containers C will be confined in the same corresponding portion of the forming surfaces of each member at the same time, thus enabling the containers C to be advanced with the mouth of each container in a substantially horizontal plane with respect to the vertical advancement of the container and confined by the forming surfaces of each member.

Referring to FIGURE 3, a plurality of containers C are shown in an upright position having stepped configurations 102 for enabling the containers to be stacked or nested in a spaced relationship. Each container has a side wall 104 terminating at one end 106 in an annular marginal rim 108. As shown in FIGURE 3, this annular marginal rim comprises an outwardly extending inner-marginal portion 110 integrally connected at its outer end to one end of a substantially axial outer marginal portion 112, with respect to the container axis, which terminates at its other end in a severed edge 114. In FIGURE 3 the outer marginal portion extends downwardly from the inner-marginal portion.

The marignal rim 108 may, however, take other configurations within the scope of the invention. For instance, in FIGURE 4 the annular marginal rim comprises an outwardly extending inner-marginal portion 110 integrally connected at its outer end to one end of an upwardly extending axial outer marginal portion 112 terminating in a severed edge 114 as compared to the downwardly extending outer marginal portion shown in FIGURE 3. It is within the scope of the invention, furthermore, to have containers with marginal rims wherein the inner and outer marginal portions, 110 and 112, are integrally connected and aligned to form an outwardly extending portion 116 only, as shown in FIGURE 5. Regardless of the configuration of the marginal rim, the containers are nevertheless maintained in a spaced relationship by the stepped configuration 102 such that a height differential 118 exists between the rims of two adjacently stacked containers.

In order to give the necessary strength and desirable appearance, the container rim is made out of foamed plastic. Preferably the entire container is made from the same material. When the entire container is made from the foamed plastic material, it may be formed by deep drawing of a foamed plastic sheet under heat and vacuum and then shearing the formed container from the scrap, such as disclosed in Tiffin et al. application, Ser. No. 261,993, filed Mar. 1, 1963, and Tiffin et al. application, Ser. No. 261,683, filed Feb. 28, 1963, the disclosures of which applications are hereby incorporated by reference into this application, or any other conventional forming process. Furthermore, various polymers can be used to form the foamed plastic.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5% divinyl benzene.

Unless otherwise indicated, all parts and percentages are by weight.

The extrudable foamable thermoplastic resins include chlorinated rubber, cellulose ethers and esters, e.g., ethyl cellulose, cellulose acetate, cellulose acetate-butyrate, bituminous materials, e.g., asphalt and coal tar pitch, paraffin wax, homopolymers and interpolymers of monomeric compounds containing the $CH_2=C<$ grouping, such as olefins, e.g., ethylene, propylene, isobutylene, butene-1, vinyl halides, e.g., vinyl chloride, vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, methyl alpha chloracrylate, ethyl acrylate, methyl methacrylate, acrylamide, acrylonitrile, methacrylonitrile, and interpolymers of the above-mentioned vinylidene monomers with alpha,beta-unsaturated polycarboxylic acids and derivatives thereof, e.g., maleic anhydride, diethyl maleate, dibutyl fumarate, diallyl maleate, dipropyl maleate, etc. A preferred class of materials with which optimum results are obtained are rigid, relatively non-elastic, thermoplastic resins such as homopolymers and interpolymers of vinyl chloride, e.g., polyvinyl chloride, vinyl chloride-vinyl acetate copolymer (87:13), vinyl chloride-acrylonitrile copolymer (80:20); homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Other suitable thermoplastic resins include polycarbonates, e.g., the polymer from bisphenol A and diphenyl carbonate; polyoxymethylene (Delrin), oxymethylene-alkylene oxide copolymers, e.g., oxymethylene-ethylene oxide (95:5), polyurethanes, e.g., from toluene diisocyanate and polypropylene glycol molecular weight 2025; Dacron (polyethylene terepthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile, and 20 to 60% styrene.

The invention is of particular value with foams from polyethylene (of high density, e.g., 0.960, medium density, e.g., 0.935, or low density, e.g., 0.914), polypropylene, copolymers of ethylene and propylene (e.g., 50–50 copolymers), and regular or high impact polystyrene. Copolymers of ethylene with butene-1 (e.g., 90:10) also can be employed.

*Example 1*

As an example a sheet of foamed plastic was prepared having a uniform blend of 50 parts of high impact polystyrene (Foster Grant's Tuflex 216, polystyrene modified with 5% polybutadiene), and 50 parts of regular crystal polystyrene (Kopper's Dylene 8).

As shown in FIGURE 1, the containers are sequentially fed to a plurality of members in an upright position. As was also previously shown in FIGURE 1, an electric motor 46 drives a pair of endless belts 48 which in turn rotate the members at the same speed and in the same direction. FIGURE 6 shows the containers C passing through the generally cylindrical passage 26 formed by the six members 24. Due to the engagement of the container by these rotating members and due to the helical configuration of the lip-forming surfaces 120, as will be more fully described hereinafter, a rotational and translational movement is imparted to the containers. Although six members are shown, it will be appreciated that any number of members may be used within the scope of the invention. Furthermore, although the containers are shown being fed in an upright position, it is within the scope of this invention to feed the containers in an inverted position.

Figures 7, 8:
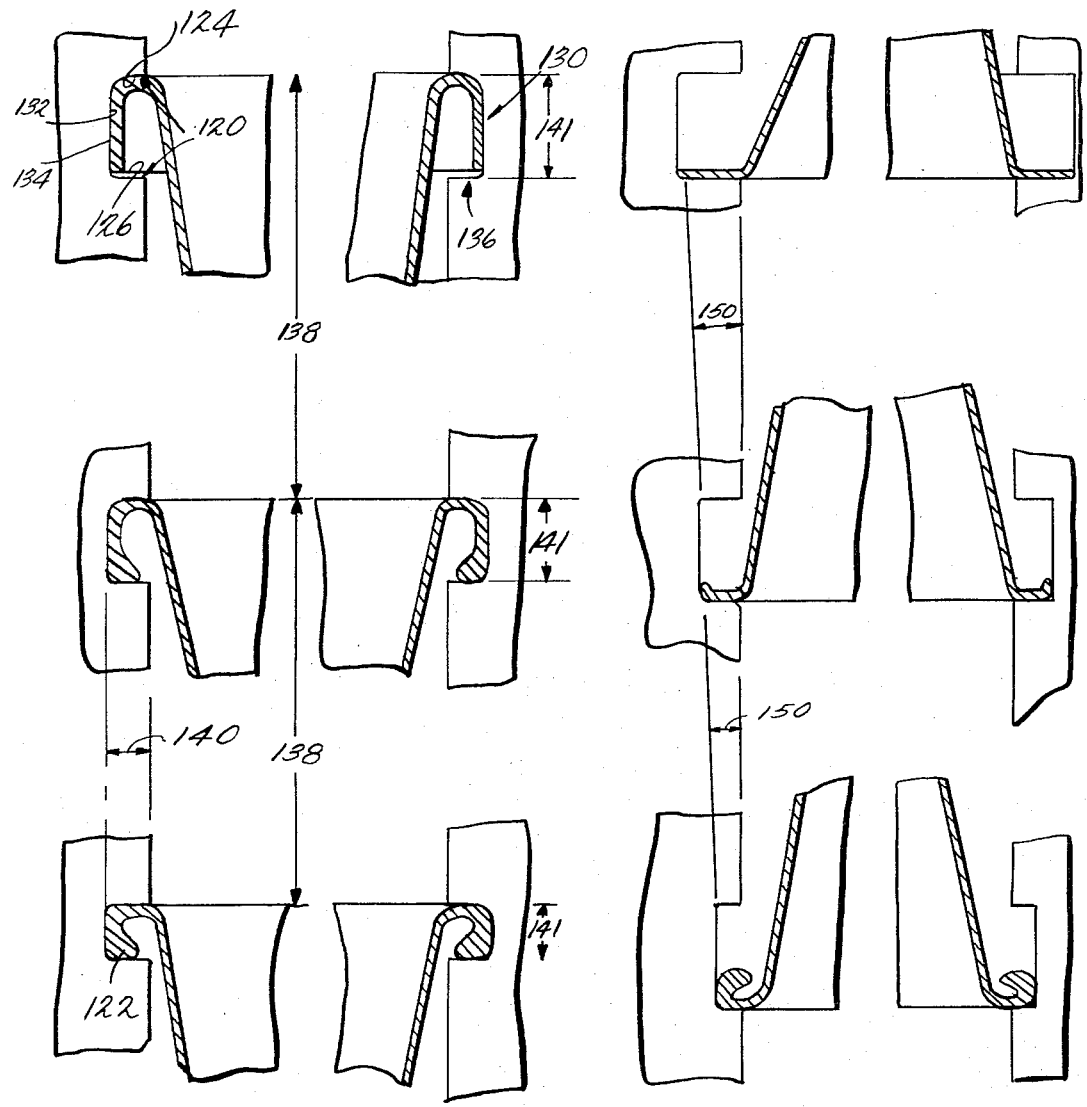
FIGURE 7 is a fragmentary side elevational view of the members carrying the helical lip-forming surfaces with progressive views of the lip being formed on the container.
FIGURE 8 is a fragmentary side elevational view of a modification of the members carrying the helical lip-forming surfaces with progressive views of the lip being formed on a container having a marginal rim comprising only an outwardly extending portion.

FIGURE 7 discloses the lip-forming surfaces 120 carried by the members and shows a lip 122 being progressively formed on the marginal rim of the container by the lip-forming surfaces. The lip-forming surfaces 120 comprise downwardly facing radial surfaces 124 and upwardly facing radial surfaces 126 axially spaced as at 128 for engaging the marginal rim of the container at a plurality of annularly spaced positions 130 and each surface extending helically around the members 24 so that as the members are rotated, a translational movement is imparted to the containers. The downwardly facing surfaces 124 have a root surface 132 extending downwardly therefrom, while the upwardly facing surfaces 126 have a root surface 134 extending upwardly therefrom. From one end of each member to the other end the axial distance between the downwardly and upwardly facing surfaces decreases. As shown in FIGURE 7 the downwardly extending root surfaces and the upwardly extending root surfaces are integrally connected and together with the radial upwardly and downwardly facing surfaces form a groove 136 in the members. Although these lip-forming surfaces take a configuration of a groove in this particular embodiment of the invention, it will be appreciated that these surfaces could assume other configurations. For instance, one such configuration could comprise radial fins helically carried by the generally cylindrical members.

The upwardly facing surface 126 forms the basic supporting surface for the container throughout its translational movement, and as such, the pitch 138 of this surface is shown remaining constant and equal to the stacked height differential 118 of the marginal rims of two adjacent containers throughout the length of the members so that the containers will remain in a nested stacked relation throughout their rotational and translational movement. It will be appreciated, however, that the pitch 138 could increase slightly to denest the containers, thus enabling each container to rotate and move translationally independently of the other containers. The width 140 of the radial downwardly facing surfaces 124 and the radial upwardly facing surfaces 126 remains constant throughout the helical length of these surfaces.

In operation, a container, having a side wall terminating at one end in an annular marginal rim of foamed plastic material with the outer marginal portion of the rim terminating in a severed edge, is fed into engagement with the lip-forming members, preferably in an upright position. During the rotational and translational movement of the container, heat is applied to the marginal rim of the container causing the surface tension of the foamed plastic material to bead and smooth out the severed edge of the outer marginal portion of the rim. Furthermore, while the application of heat to the outer marginal portion of the rim causes it to soften, the additional application of compressive forces pressing against the edge in the direction of the extent of the outer marginal portion of the rim causes the outer marginal portion of the rim to be deformed into a smooth lip having a greater material thickness T' and an equal or greater density than the original material thickness T and density of the outer marginal portion of the rim.

When the marginal rim of the container has a configuration in which the outer marginal portion of the rim extends axially upwardly or downwardly, as shown in FIGURES 3 and 4, respectively, the compressive forces applied solely axially by the decreasing axial distance 141 between the upwardly facing and downwardly facing surfaces resulting in the lip configurations 142 and 144, shown in FIGURES 9 and 10, respectively. The downwardly and upwardly extending root surfaces serve to confine the outward radial deformation of the outer marginal portion of the rim.

It will be appreciated that the method of beading and deforming the severed edge and outer marginal portion of the rim by heating and applying compressive forces against the severed edge in the direction of the extent of the outer marginal portion encompasses the beading and deformation of the marginal rim of a container having only an outwardly extending marginal rim resulting in the lip configurations 146 and 148, shown in FIGURES 11 and 12, depending on whether the containers are fed in an inverted (FIGURE 11) or upright (FIGURE 12) position. In order to provide the necessary compressive force, it will be necessary to vary the width 150 of the downwardly and upwardly facing surfaces, as shown in FIGURE 8. In this particular instance the downwardly and upwardly extending root surfaces will provide a compressive force against the severed edge of the marginal rim in the direction of the extent of the outer marginal portion of the rim while heating the rim so as to form a smooth bead on the edge and deform the outer marginal portion into a smooth lip having a greater material thickness and an equal or greater density than the original material thickness and density of the outer marginal portion of the rim. Preferably the container in this particular situation would be fed in an inverted position so that the smoothly beaded lip would be formed on the underside of the marginal rim, as shown in FIGURE 11. However, in some instances, it may be desirable to form the lip on the upperside of the marginal rim, as shown in FIGURE 12, and thus the container would be fed in an upright position.

It will be appreciated that the radial application of compressive forces could also be acomplished by offsetting the members so that they no longer remain substantially parallel to each other. By canting the bottoms of the members towards the common axis, the downwardly and upwardly extending root surfaces will be radially moved toward the common axis through the helical length of these root surfaces, so as to provide the necessary compressive force. It is within the scope of this invention to provide any other means to effect these compressive forces.

FIGURES 13 and 14 disclose another embodiment of the invention in which the upwardly 220 and downwardly 222 facing helical radial surfaces are alternately disposed on a plurality of members 224. Preferably there is an even number of these cylindrical members such that the upwardly facing surfaces are alternately carried by the even numbered members 226 while the downwardly facing surfaces are carried by the odd numbered members 228. As in FIGURE 7, the upwardly facing surfaces 220 have upwardly extending root surfaces 230 while the downwardly facing surfaces 222 have downwardly extending root surfaces 232, and the axial distance 234 between the upwardly and downwardly facing surfaces decreases throughout the length of the members. The even numbered lip-forming surfaces 236, for instance the downwardly facing surfaces, have one pitch 238, while the odd numbered lip-forming surfaces 240, for instance the upwardly facing surfaces, have another different pitch 242. The smallest pitch of any one set of surfaces, as at 244, remains constant and equal to the stacked height differential 118 of the rims of two adjacent containers throughout the length of the members so that the containers will be translationally moved in a stacked or nested relationship. The pitch of the other set of lip-forming surfaces, as at 246, is increased so as to decrease the axial distance 247 between the two sets of lip-forming surfaces.

In operation, therefore, a container having a side wall terminating at one end in an annular marginal rim comprising an outwardly extending inner marginal portion integrally connected at its outer end to one end of a substantially axial outer marginal portion, with respect to the container axis, which terminates at the other end in a severed edge is fed to the members 224. The outer marginal portion of the container rim is alternately engaged on the top 254 and bottom 256 portion thereof by the upwardly facing surfaces 220 and the downwardly facing surfaces 222, respectively, when fed to the members in an inverted position, and compressed solely by applying axial pressures. In general, therefore, one set of lip-forming surfaces supports the container, as at 248, while the other set of lip-forming surfaces, decreasing in axial distances from the first set, presses against the severed edge in the direction of the extent of the outer marginal portion of the rim, as at 250, while heating the rim so as to form a smooth bead on the edge and so as to soften the material in order that the outer marginal portion can be deformed into a smooth lip having a greater material thickness and an equal or greater density than the original material thickness and density of the outer marginal portion of the rim. The downwardly and upwardly extending root surfaces serve to confine the outward radial deformation of the outer marginal portion of the rim.

It will be appreciated that although the lip-forming surfaces disclosed in FIGURE 14 form a groove configuration 252, nevertheless these surfaces could take configurations such as helical fins carried by the generally cylindrical members. Furthermore, it will be appreciated that this method is applicable only to those containers having a side wall terminating in an outwardly extending inner-marginal portion integrally connected at its outer end to one end of a substantially axial outer marginal portion, and as such a container having only an outwardly extending marginal rim could not be used in this type of arrangement.

As was previously stated, the rim of the container is heated in order to bead the severed edge and easily deform the outer marginal portion of the rim. The heat that is applied to the rim of the container must not cause the temperature of the rim of the container to exceed the point at which it has a low viscosity hereinafter referred to as low viscosity point. Foamed plastics, such as heretofore described as being used in these types of containers, do not have a clearly defined melting point, thus the term low viscosity point is used. It is a point at which the foamed plastic has sufficient stickiness or gumminess to be deformed into a relatively definite shape. Beyond this point, which might also be termed the deformation point, the material assumes a soft jelly-like consistency lacking the strength to assume a relatively definite deformed shape.

Because of this low viscosity point up to which the rim of the container can be heated, the temperatures which are employed are dependent upon the time that the container remains engaged by the heated lip-forming surfaces. By increasing the rotational speed of the members the production of containers is correspondingly increased. Inasmuch as the containers under this increased production rate will remain in contact with the members for a shorter period of time, it will be necessary to either use a higher temperature to obtain the desired softening of the foam plastic or to increase the length of the generally cylindrical members so that the container will remain engaged with the heated surfaces for a longer period of time.

The temperature of heat applied to the lip-forming members decreases throughout the length of the member. For instance, in one operating model the temperature of the ends of the members, 15 inches in length, which first received the container was 280° F., and at the other ends of the members the temperature was 190° F. These particular members were operating at 500 r.p.m., thus producing containers at the rate of 500 containers per minute.

The use of the insulating means in each member accelerates the decrease in temperature in the lip-forming members. Some heat will be carried by the containers to that part of each member which is insulated from the upper portion of the member by the insulating means 56 as described heretofore. However, if the insulating means does not provide a sufficient decrease in temperature, the portion of the member below the insulating means can be additionally cooled by such means as was heretofore described. It is necessary at the point of container exit to cool the members and the container lip to a point below the heat distortion point of the foamed plastic so as to set the lip.

While my invention has been described in relation to a plurality of containers, it will be appreciated that the principles of the invention can be applied to an individual container fed to the plurality of generally cylindrical members. Thus, as heretofore described, the containers may be underfed to the lip-forming apparatus with the result that each container is fed through the apparatus independently.

While a preferred form of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the claims appended hereto.

What is claimed is:

1. An apparatus for forming a smoothly beaded lip on a container having a side wall terminating at one end in an annular marginal rim of plastic material with the outer marginal portion of said rim terminating in a severed edge comprising: a plurality of generally cylindrical members mounted on each end for rotation about parallel axes equiradially disposed from a common central axis and equi-circumferentially disposed from each other; means for rotating said members about their axes so as to impart a rotational and translational movement to said containers fed to one end of said members; means for heating said rim; and means carried by said members for confining and deforming said outer marginal portion into a smooth lip having a greater material thickness and an equal or greater density than the original material thickness and density of the outer marginal portion of the rim, said means comprising downwardly facing radial surfaces helically carried by said members and axially spaced upwardly facing radial surfaces helically carried by said members for engaging said rim at a plurality of annularly spaced positions during said movement, said downwardly facing surfaces having root surfaces extending downwardly therefrom and said upwardly facing surfaces having root surfaces extending upwardly therefrom, the dimension of said helical groove corresponding to and substantially parallel to the initial direction of said outer marginal portion decreasing through at least a portion of the length of said helical groove.

2. The apparatus as defined in claim 1 wherein the axial distance between said downwardly and upwardly facing surfaces of said helical groove decreases the width of said upwardly and downwardly facing radial surfaces remains constant through at least a portion of the length of said helical groove.

3. The apparatus as defined in claim 1 wherein the width of said upwardly and downwardly facing surfaces decreases through at least a portion of the length of said helical groove.

4. The apparatus as defined in claim 1 wherein said annular marginal rim of said container comprises an outwardly extending inner marginal portion integrally connected at its outer end to one end of a substantially axial outer marginal portion, with respect to the container axis, which terminates in said severed edge and wherein said upwardly facing radial surfaces and said downwardly facing radial surfaces are alternately disposed on said plurality of generally cylindrical members so as to alternately engage said outer marginal portion of said marginal rim on the top and bottom portions thereof.

5. An apparatus for forming a smooth lip on a container having a marginal rim comprising a radially outwardly extending portion and an axially depending portion integrally connected to the outer end of the radially outwardly extending portion and terminating in a severed edge comprising:
- means for effecting a rotational movement of the container about its vertical axis;
- means for heating the marginal rim of the container;
- means for radially confining outward movement of the axially depending rim portion and means for axially confining the movement of the radially extending rim portion in a direction opposite to the initial axial extent of the rim at a plurality of spaced positions around the rim during said rotational movement of the container; and
- means for simultaneously axially compressing the axially depending rim portion toward the radial rim portion so as to form a smooth bead on the severed edge and deform a portion of the rim radially inwardly.

6. An apparatus for forming a smooth lip on a container having a marginal rim comprising a radially outwardly extending portion and an axially depending portion integrally connected to the outer end of the radially outwardly extending portion and terminating in a severed edge comprising:
- means for effecting a rotational movement of the container about its vertical axis;
- means for heating the marginal rim of the container;
- means for engaging the marginal rim at a plurality of spaced positions during said rotational movement;
- means for radially confining outward movement of the axially depending rim portion at each of said spaced positions; and
- means for simultaneously and alternately axially compressing the axially extending rim portion toward the radial rim portion and for axially confining movement of the radially extending rim portion in a direction opposite to the initial axial extent of the rim and in a direction opposite to the direction of axial compression at at least two adjacent spaced positions whereby the axial rim portion is compressed at one position while the radial rim portion is confined at the other adjacent position so as to form a bead on the severed edge on the rim and deform a portion of the rim into a smooth lip.

7. An apparatus for forming a smooth beaded lip on a container having a marginal rim comprising a radially outwardly extending portion and an axially depending portion integrally connected to the outer end of the radially outwardly extending portion and terminating in a severed edge comprising:
- a plurality of generally cylindrical members mounted on each end for rotation about parallel axes equiradially disposed from a common central axis and equi-circumferentially disposed from each other;
- means for rotating said members about their axes so as to impart a rotational movement to said container when fed between said members;
- means for heating at least one of said members;
- each of said members having a helical groove for confining and deforming the marginal rim into a smooth lip, the groove of each of said members having an upwardly facing substantially horizontal radial surface, a downwardly facing, substantially horizontal radial surface, and a substantially vertical root surface connecting in the inner ends of said horizontal surfaces, the axial distance between said horizontal surfaces decreasing while the width of said horizontal surfaces remains constant throughout a portion of the length of said groove.

8. An apparatus for forming a smooth beaded lip on a container having a marginal rim comprising a radially outwardly extending portion and an axially depending portion integrally connected to the outer end of said radially outwardly extending portion and terminating in a severed edge comprising:
- a plurality of generally cylindrical members mounted on each end for rotation about parallel axes equiradially disposed from a common central axis and equi-circumferentially disposed from the other;
- means for rotating said members about their axes so as to impart a rotational movement to the container when fed between said members;
- means for heating at least one of said members;
- each of said members having a helical groove with an upwardly facing surface and a downwardly facing surface, said upwardly and downwardly facing surfaces of the same corresponding portion of the helical grooves in adjacent members being axially displaced with respect to each other, and the upwardly and downwardly facing surfaces of the same corresponding portion of the helical groove in every other member about the circumferential arrangement of said members having the same axial elevation, whereby the radially outwardly extending portion of the rim is engaged by one set of surfaces of equal elevation and the free edge of the axially extending portion of the rim is engaged by the other set of surfaces of equal elevation, the two sets of surfaces being axially displaced with respect to each other and decreasing in said axial displacement through at least a portion of the length of said groove so as to cooperate to form a smooth lip on the container.

9. The apparatus as defined in claim 8 wherein said upwardly facing surfaces have upwardly extending root surfaces integrally formed therewith and adapted to engage the axially depending portion of the rim and wherein said downwardly facing surfaces have downwardly extending root surfaces integrally formed therewith adapted to engage the axially depending portion of the rim, said root surfaces confining outward radial movement of the axially depending portion of the rim.

10. The apparatus as defined in claim 1 wherein said annular marginal rim of said container comprises an outwardly extending inner marginal portion integrally connected at its outer end to one end of a substantially axial outer marginal portion, with respect to the container axis, which terminates in said severed edge and wherein each of said members has an upwardly facing radial surface and a downwardly facing radial surface, both said surfaces being adapted to engage said outer marginal portion of said marginal rim on the top and bottom portions thereof during the formation of said rim into a smoothly beaded lip.

References Cited

UNITED STATES PATENTS 3,096,546 1/1963 Edwards _____ 18—19 XR
3,192,565 7/1965 Rukavina _____ 18—19

WILLIAM J. STEPHENSON, *Primary Examiner.*